United States Patent
Eijsbouts-Spickova et al.

(10) Patent No.: US 9,254,478 B2
(45) Date of Patent: Feb. 9, 2016

(54) SOLUTIONS AND CATALYSTS COMPRISING GROUP VI METAL, GROUP VIII METAL, PHOSPHORUS AND AN ADDITIVE

(75) Inventors: Sona Eijsbouts-Spickova, Nieuwkuijk (NL); Marcel Adriaan Jansen, Nieuw Vennep (NL)

(73) Assignee: ALBEMARLE CORPORATION, Baton Rouge, LA (US)

( * ) Notice: Subject to any disclaimer, the term of this patent is extended or adjusted under 35 U.S.C. 154(b) by 1020 days.

(21) Appl. No.: 13/391,336

(22) PCT Filed: Aug. 24, 2010

(86) PCT No.: PCT/EP2010/062282
§ 371 (c)(1),
(2), (4) Date: Feb. 20, 2012

(87) PCT Pub. No.: WO2011/023668
PCT Pub. Date: Mar. 3, 2011

(65) Prior Publication Data
US 2012/0145600 A1    Jun. 14, 2012

Related U.S. Application Data

(60) Provisional application No. 61/236,436, filed on Aug. 24, 2009.

(51) Int. Cl.
| | | |
|---|---|---|
| *B01J 31/06* | (2006.01) | |
| *B01J 27/185* | (2006.01) | |
| *B01J 27/19* | (2006.01) | |
| *B01J 23/888* | (2006.01) | |
| *B01J 21/04* | (2006.01) | |
| *B01J 23/88* | (2006.01) | |
| *B01J 37/02* | (2006.01) | |
| *B01J 37/08* | (2006.01) | |
| *C10G 49/04* | (2006.01) | |
| *B01J 27/186* | (2006.01) | |

(52) U.S. Cl.
CPC .............. *B01J 23/888* (2013.01); *B01J 21/04* (2013.01); *B01J 23/88* (2013.01); *B01J 27/1853* (2013.01); *B01J 27/19* (2013.01); *B01J 37/0203* (2013.01); *B01J 37/0213* (2013.01); *B01J 37/0236* (2013.01); *B01J 37/08* (2013.01); *C10G 49/04* (2013.01)

(58) Field of Classification Search
CPC ........ B01J 27/185; B01J 27/186; B01J 27/19; B01J 31/06
See application file for complete search history.

(56) References Cited

U.S. PATENT DOCUMENTS

| | | |
|---|---|---|
| 3,629,146 A | 12/1971 | Adams |
| 3,954,673 A | 5/1976 | Morimoto |
| 4,530,911 A | 7/1985 | Ryan et al. |
| 4,632,914 A | 12/1986 | Arias et al. |
| 5,164,354 A | 11/1992 | Aldridge et al. |
| 5,468,709 A | 11/1995 | Yamaguchi et al. |
| 5,891,821 A | 4/1999 | Poulet et al. |
| 6,090,745 A | 7/2000 | DuBois et al. |
| 6,280,610 B1 | 8/2001 | Uragami et al. |
| 6,436,870 B1 | 8/2002 | Iijima et al. |
| 6,492,296 B2 | 12/2002 | Eijsbouts |
| 6,509,291 B2 | 1/2003 | Eijsbouts |
| 6,540,908 B1 | 4/2003 | Eijsbouts et al. |
| 6,635,596 B1 | 10/2003 | Eijsbouts et al. |
| 6,753,291 B2 | 6/2004 | Eijsbouts et al. |
| 6,872,678 B2 | 3/2005 | Eijsbouts |
| 6,923,904 B1 | 8/2005 | Plantenga |
| 7,087,546 B2 | 8/2006 | Eijsbouts et al. |
| 7,361,624 B2 | 4/2008 | Fujikawa et al. |
| 7,393,807 B2 | 7/2008 | Yoshimura et al. |
| 7,956,000 B2 | 6/2011 | Jansen et al. |
| 2002/0013223 A1 | 1/2002 | Eijsbouts et al. |
| 2003/0173256 A1 | 9/2003 | Fujikawa et al. |
| 2004/0132614 A1 | 7/2004 | Harle et al. |

(Continued)

FOREIGN PATENT DOCUMENTS

| | | | |
|---|---|---|---|
| CA | 2302969 A1 | 10/2000 | |
| CN | 1172692 A | 2/1998 | |

(Continued)

*Primary Examiner* — Brian McCaig
(74) *Attorney, Agent, or Firm* — Nathan C. Dunn

(57) ABSTRACT

This invention provides a process for forming a solution composition, which process comprises forming a primary solution by bringing together, in an aqueous medium, i) at least one phosphorus compound, ii) at least one Group VI metal compound, iii) at least one Group VIII metal compound, and iv) an additive which is a) tetraethylene glycol, b) polyethylene glycol having an average molecular weight in the range of about 200 to about 400, c) a mixture of tetraethylene glycol and polyethylene glycol having an average molecular weight in the range of about 200 to about 400, or d) a mixture of (1) tetraethylene glycol and/or polyethylene glycol having an average molecular weight in the range of about 200 to about 400 and (2) one or more of monoethylene glycol, diethylene glycol, and triethylene glycol. The molar ratio of additive to the total moles of Group VI metal and Group VIII metal is above 0.30:1, and the atomic ratio of phosphorus to Group VI metal is at least about 0.33:1. Optionally, the primary solution is heated at a temperature above about 40° C. to form a heated solution. The heated solution is optionally cooled to form a cooled solution. Also provided are compositions formed by such processes, processes for forming catalyst compositions from these compositions, and catalyst compositions formed by these processes.

15 Claims, No Drawings

(56) References Cited

U.S. PATENT DOCUMENTS

| | | |
|---|---|---|
| 2004/0186013 A1 | 9/2004 | Iwata et al. |
| 2005/0109674 A1 | 5/2005 | Klein |
| 2005/0250863 A1 | 11/2005 | Green et al. |
| 2005/0261124 A1 | 11/2005 | Yoshimura et al. |
| 2007/0135300 A1 | 6/2007 | Kagami et al. |
| 2007/0275845 A1 | 11/2007 | Jansen et al. |
| 2008/0017551 A1* | 1/2008 | Kiriyama et al. ............ 208/134 |
| 2011/0094939 A1 | 4/2011 | Jansen et al. |

FOREIGN PATENT DOCUMENTS

| | | |
|---|---|---|
| EP | 0494528 B1 | 7/1992 |
| EP | 0601722 A1 | 6/1994 |
| EP | 0870003 B1 | 10/1998 |
| EP | 1041133 A1 | 10/2000 |
| EP | 1043069 A1 | 10/2000 |
| EP | 1202800 B1 | 5/2002 |
| EP | 1272271 B1 | 1/2003 |
| EP | 1272272 B1 | 1/2003 |
| EP | 1274507 B1 | 1/2003 |
| EP | 1399386 B1 | 3/2004 |
| EP | 1418002 A2 | 5/2004 |
| EP | 1600212 A1 | 11/2005 |
| EP | 1712277 A1 | 10/2006 |
| GB | 1282949 | 7/1972 |
| GB | 1364340 | 8/1974 |
| GB | 2291818 A | 2/1996 |
| JP | 2006-210182 A | 8/1994 |
| JP | 2002-045698 A | 2/2002 |
| JP | 2002-126539 A | 5/2002 |
| JP | 2003-299960 A | 10/2003 |
| JP | 2005-262173 A | 9/2005 |
| JP | 2006-061845 A | 3/2006 |
| WO | 96/41848 A1 | 12/1996 |
| WO | 99/48975 A1 | 9/1999 |
| WO | 01/02092 A1 | 1/2001 |
| WO | 01/76741 A1 | 10/2001 |
| WO | 2005/035691 A1 | 4/2005 |
| WO | 2006/046254 A1 | 5/2006 |
| WO | 2006/077326 A1 | 7/2006 |
| WO | 2007-027079 A1 | 3/2007 |
| WO | 2007/070394 A2 | 6/2007 |
| WO | 2010/121807 A1 | 10/2010 |

* cited by examiner

SOLUTIONS AND CATALYSTS COMPRISING GROUP VI METAL, GROUP VIII METAL, PHOSPHORUS AND AN ADDITIVE

REFERENCE TO RELATED APPLICATIONS

This application is the National Stage of International Patent Appl. No. PCT/EP2010/062282 filed on Aug. 24, 2010, which in turn claims the benefit of U.S. Provisional Patent Appl. No. 61/236,436, filed on Aug. 24, 2009, the disclosures of which are incorporated herein by reference.

TECHNICAL FIELD

This invention relates to concentrated solutions comprising a Group VI metal, a Group VIII metal, and phosphorus, and to catalysts made from such solutions.

BACKGROUND

A variety of catalysts for hydrotreating, hydrodesulfurization, and/or hydrodenitrogenation are known in the prior art and/or are commercially available. In this connection, EP 0601722 describes catalysts for hydrodesulfurization and hydrodenitrogenation of hydrocarbon oils. The catalysts therein are formed by impregnation of an alumina carrier; the impregnation solution contains at least one Group VI metal element, at least one Group VIII metal element, phosphoric acid, and an additive agent. In the impregnation solutions of EP 0601722, the additive agents include at least one dihydric or trihydric alcohol having 2 to 10 carbon atoms per molecule, and ethers of these alcohols; the amount of additive agent is such that the molar ratio of additive agent to total moles of the Group VI metal element and the Group VIII metal element is in the order of 0.05:1 to 3:1. However, during preparation of solutions according to EP 0601722, it was observed that a solution containing polyethylene glycol-200 at an additive: metal ratio of 0.22:1, a phosphorus to Group VI metal ratio of 0.60:1, and a molybdenum concentration of about 450 g/L (expressed as $MoO_3$) contained precipitate. In contrast, for a solution in which the polyethylene glycol-200 was at an additive:metal ratio of 0.22:1, the phosphorus to Group VI metal ratio was 0.14:1, and the molybdenum concentration was about 450 g/L (expressed as $MoO_3$), no precipitate was seen.

When forming catalysts for hydrotreating, hydrodesulfurization, and/or hydrodenitrogenation via impregnation of a support, precipitate formation in the impregnation solution is usually undesirable. Thus, the art continually strives to form impregnation solutions without precipitate from which to make catalysts with higher activities for hydrotreating, hydrodesulfurization, and/or hydrodenitrogenation.

SUMMARY OF THE INVENTION

This invention provides solutions comprising Group VI metal, Group VIII metal, and phosphorus, which solutions have higher concentrations of a particular additive, and permits precipitate-free solutions having higher concentrations of phosphorus than previously achieved, while still having the properties of an impregnation solution (e.g., the solution can sufficiently impregnate the support, and the catalyst components do not adhere to the impregnation solution's container). Also provided by this invention are processes for forming such solutions, and catalysts made from such solutions.

An embodiment of this invention is a process for forming a solution composition, which process comprises forming a primary solution by bringing together, in an aqueous medium, i) at least one phosphorus compound,
ii) at least one Group VI metal compound,
iii) at least one Group VIII metal compound, and
iv) an additive which is
   a) tetraethylene glycol,
   b) polyethylene glycol having an average molecular weight in the range of about 200 to about 400,
   c) a mixture of tetraethylene glycol and polyethylene glycol having an average molecular weight in the range of about 200 to about 400, or
   d) a mixture of (1) tetraethylene glycol and/or polyethylene glycol having an average molecular weight in the range of about 200 to about 400 and (2) one or more of monoethylene glycol, diethylene glycol, and triethylene glycol.

The molar ratio of additive to the total moles of Group VI metal and Group VIII metal is above 0.30:1, and the atomic ratio of phosphorus to Group VI metal is at least about 0.33:1. Optionally, the primary solution is heated at a temperature above about 40° C. to form a heated solution. The heated solution is optionally cooled to form a cooled solution.

Another embodiment of this invention is a solution composition formed by the just-described process. Still another embodiment of this invention is a process for forming a catalyst, which process comprises bringing together a carrier and an impregnation solution comprising a composition of this invention.

These and other embodiments and features of this invention will be still further apparent from the ensuing description and appended claims.

FURTHER DETAILED DESCRIPTION OF THE INVENTION

As used throughout this document, the phrases "solution composition" and "solution composition of this invention" refer to the compositions described herein as solutions comprising a Group VI metal, a Group VIII metal, phosphorus, and the additive, where the molar ratio of the additive to the total moles of Group VI metal and Group VIII metal is above 0.30:1. The phosphorus and Group VI metal are typically in atomic ratio of at least about 0.33:1, and the Group VI metal and the Group VIII metal are generally in an atomic ratio of at least about 1.5:1.

Throughout this document, the phrases "hydrogenation metal" and "hydrogenation metals" refer to the Group VI metal or metals and the Group VIII metal or metals collectively. As used throughout this document, the term "Group VI metal" refers to the metals of Group VIB.

As used throughout this document, the phrases "as the Group VI metal trioxide," "reported as the Group VI metal trioxide," "calculated as the Group VI metal trioxide," and analogous phrases for the Group VI metals as their monoxides and phosphorus as phosphorus pentoxide ($P_2O_5$) refer to the amount or concentration of Group VI metal, Group VIII metal, or phosphorus, where the numerical value is for the respective oxide, unless otherwise noted. For example, nickel carbonate may be used, but the concentration of nickel in the solution is stated as the value for nickel oxide.

Throughout this document, unless otherwise noted, the term "the additive" refers to a) tetraethylene glycol, b) polyethylene glycol having an average molecular weight in the range of about 200 to about 400, c) a mixture of tetraethylene glycol and polyethylene glycol having an average molecular weight in the range of about 200 to about 400, or d) a mixture of (1) tetraethylene glycol and/or polyethylene glycol having an average molecular weight in the range of about 200 to about 400 and (2) one or more of monoethylene glycol, diethylene glycol, and triethylene glycol. Polyethylene glycols are usually referred to by their average molecular weight; for example, polyethylene glycol 200 has an average molecular weight of about 200. Preferred polyethylene glycols are those having an average molecular weight between about 200 and about 400; more preferred is polyethylene glycol having an average molecular weight of about 200. Preferred additives include polyethylene glycol 200, and mixtures of triethylene glycol with tetraethylene glycol and/or polyethylene glycol having an average molecular weight in the range of about 200 to about 400.

When the additive is a mixture of (1) tetraethylene glycol and/or polyethylene glycol having an average molecular weight in the range of about 200 to about 400 and (2) one or more of monoethylene glycol, diethylene glycol, and triethylene glycol, the component glycols are generally in proportions such that a solution that does not have a precipitate either initially, or after heating and/or cooling. Another consideration for the mixtures is that for additives with higher boiling points, more of the additive is retained during catalyst drying and optional sulfidation steps, and thus mixtures containing a reasonable proportion of the higher-boiling glycol(s) are preferred. Generally, glycol mixtures in which the molar ratio of tetraethylene glycol and/or polyethylene glycol to monoethylene glycol, diethylene glycol, and/or triethylene glycol is about 0.15:1 or more are preferred. Examples of convenient ratios for a two-component glycol mixture are 1:1 by weight and 1:1 by moles.

Processes of the invention for forming solution compositions of the invention comprise bringing together, in an aqueous medium, i) at least one phosphorus compound; ii) at least one Group VI metal compound; iii) at least one Group VIII metal compound; and iv) an additive which is a) tetraethylene glycol, b) polyethylene glycol having an average molecular weight in the range of about 200 to about 400, c) a mixture of tetraethylene glycol and polyethylene glycol having an average molecular weight in the range of about 200 to about 400, or d) a mixture of (1) tetraethylene glycol and/or polyethylene glycol having an average molecular weight in the range of about 200 to about 400 and (2) one or more of monoethylene glycol, diethylene glycol, and triethylene glycol. The molar ratio of additive to the total moles of Group VI metal and Group VIII metal is above 0.30:1, based on the amounts of components brought together. Generally, the components are in amounts such that the phosphorus and the Group VI metal are in an atomic ratio of at least about 0.33:1, and the Group VI metal and the Group VIII metal are usually in an atomic ratio of at least about 1.5:1.

The Group VI metal is molybdenum, tungsten, and/or chromium; preferably molybdenum or tungsten, more preferably molybdenum. The Group VIII metal is iron, nickel and/or cobalt, preferably nickel and/or cobalt. Preferred mixtures of metals include a combination of nickel and/or cobalt and molybdenum and/or tungsten. When hydrodesulfurization activity of the catalyst is to be emphasized, a combination of cobalt and molybdenum is advantageous and preferred. When hydrodenitrogenation activity of the catalyst is to be emphasized, a combination of nickel and molybdenum and/or tungsten is advantageous and preferred. Another preferred combination of hydrogenation metals is nickel, cobalt and molybdenum.

The Group VI metal compound can be an oxide, an oxo acid, or an ammonium salt of an oxo or polyoxo anion; these Group VI metal compounds are formally in the +6 oxidation state when the metal is molybdenum or tungsten. Oxides and oxo-acids are preferred Group VI metal compounds. Suitable Group VI metal compounds in the practice of this invention include chromium(III) oxide, ammonium chromate, ammonium dichromate, molybdenum trioxide, molybdic acid, ammonium molybdate, ammonium para-molybdate, tungsten trioxide, tungstic acid, ammonium tungsten oxide, ammonium metatungstate hydrate, ammonium para-tungstate, and the like. Preferred Group VI metal compounds include chromium(III) oxide, molybdenum trioxide, molybdic acid, ammonium para-tungstate, tungsten trioxide and tungstic acid. Mixtures of any two or more Group VI metal compounds can be used.

The Group VIII metal compound is usually an oxide, hydroxide or a salt. Suitable Group VIII metal compounds include, but are not limited to, iron oxide, iron hydroxide, iron nitrate, iron carbonate, iron hydroxy-carbonate, iron acetate, iron citrate, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include iron hydroxide, iron carbonate, iron hydroxy-carbonate, cobalt hydroxide, cobalt carbonate, cobalt hydroxy-carbonate, nickel hydroxide, nickel carbonate, and nickel hydroxy-carbonate. Mixtures of two or more Group VIII metal compounds can be used.

In the practice of this invention, the phosphorus compound is typically a water soluble, acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates. Mixtures of two or more phosphorus compounds can be used. The phosphorus compound may be used in liquid or solid form. A preferred phosphorus compound is orthophosphoric acid ($H_3PO_4$).

Typically, the concentration of the additive is about 30 g/L to about 700 g/L. Preferably, the additive concentration is in the range of about 40 g/L to about 680 g/L, and more preferably in the range of about 50 g/L to about 650 g/L.

In these processes, an organic acid is optionally included. The optional organic acid has at least one acid group and at least one functional group selected from a hydroxyl group and an acid group. Thus, at a minimum, the organic acid has one acid group and one hydroxyl group, or two acid groups. As used herein, the term "acid group" means the —COOH moiety. The organic acid preferably has at least two carboxylic acid moieties, and preferably has at least about three carbon atoms. It is sometimes preferred that the organic acid has at least one hydroxyl group. Suitable organic acids include citric acid, gluconic acid, lactic acid, malic acid, maleic acid, malonic acid, oxalic acid, tartaric acid, and the like. Citric acid is a preferred organic acid. Mixtures of acids can be used.

When forming a solution composition of the invention, the Group VI metal and the Group VIII metal are usually in an atomic ratio of at least about 1.5:1, preferably in the range of about 1.5:1 to about 6:1, more preferably in the range of about 2:1 to about 5:1. The atomic ratio of phosphorus to Group VI metal is typically at least about 0.33:1, preferably in the range of about 0.33:1 to about 0.8:1, more preferably in the range of about 0.38:1 to about 0.7:1, and still more preferably about 0.45:1 to about 0.7:1. Generally, the molar ratio of optional organic acid, when present, to the total molar amount of the Group VI and VIII metal components present in the solution is at least about 0.01:1, preferably in the range of about 0.01:1 to about 0.6:1, more preferably in the range of about 01:1 to about 0.4:1. In these relative amounts, where a mixture of compounds is used, it is understood that the total amount of a particular type of compound is used in calculating the ratios.

Combining of the components in the process can be done at ambient conditions, i.e., room temperature and ambient pressure. Temperatures in excess of about 95° C. and/or elevated pressures can be applied (e.g., hydrothermal preparation), but are not required. When the components are combined, a primary solution is formed. A recommended method for preparing the primary solution is via preparation of an initial solution from the phosphorus compound, Group VI metal compound, Group VIII metal compound, and the additive is then combined with the initial solution to form the primary solution. Usually, the initial solution is heated to ensure dissolution of the components.

If the primary solution is not subjected to optional heating or optional cooling, the primary solution is the solution composition. In the primary solutions, the concentrations of the Group VI metal (or total thereof, if more than one Group VI metal is present in the composition) are often in the range of about 1.35 mol/L to about 5.9 mol/L, preferably in the range of about 1.9 mol/L to about 4.2 mol/L. For processes in which solutions having Group VI and Group VIII metal concentrations at the higher end of this range are formed, when an optional organic acid is included, it is recommended that at least a portion of the optional organic acid is combined either before or concurrently with the addition of the Group VIII metal compound.

In the optional heating step, the primary solution is heated at a temperature above about 40° C. to form a heated solution. Elevated temperatures can increase the rate of dissolution, and have been observed to affect the precipitation properties of solutions formed by the processes of this invention. More specifically, it has been observed that digesting (heating) some of the primary solutions which had precipitate therein caused the precipitate to dissolve; in these solutions, the precipitate did not reform after the solution was cooled to room temperature. Such elevated temperatures for digestion (heating) are typically in the range of about 40° C. to about 95° C., preferably about 50° C. to about 95° C., and more preferably about 60° C. to about 95° C. This digestion effect was more pronounced for solutions made from components in which the molar ratio of additive to hydrogenation metals was higher than about 0.35:1, which solutions had a precipitate before digestion, but not after digestion and cooling. Whether to use a lesser amount of additive and digest the solution or to use a greater amount of additive such that digestion is not needed is normally a balance of cost for time and energy to heat versus the material cost of using greater amounts of additive.

The heated solution is optionally cooled to form a cooled solution. Often, heated solutions are subjected to the cooling step. Cooling is usually to ambient (room) temperature, typically in the range of about 15° C. to about 25° C., often about 17° C. to about 23° C. However, if the solution, after preparation, is to be employed at an elevated temperature (e.g., 40° C. to 50° C.), the solution only needs to be cooled to the temperature at which it will be employed, if that temperature is lower than the temperature to which the solution was heated during the heating step.

The compositions of the invention, formed in a process as described above, are solutions comprising a Group VI metal, a Group VIII metal, phosphorus, and additive which is a) tetraethylene glycol, b) polyethylene glycol having an average molecular weight in the range of about 200 to about 400, c) a mixture of tetraethylene glycol and polyethylene glycol having an average molecular weight in the range of about 200 to about 400, or d) a mixture of (1) tetraethylene glycol and/or polyethylene glycol having an average molecular weight in the range of about 200 to about 400 and (2) one or more of monoethylene glycol, diethylene glycol, and triethylene glycol.

In the compositions of the invention, the mole ratio of the additive to the total moles of Group VI and Group VIII metals is above 0.30:1. The Group VI metal and the Group VIII metal are generally in a molar ratio of at least about 1.5:1 in the compositions of the invention. The phosphorus and Group VI metal are typically in an atomic ratio of at least about 0.33:1. Without wishing to be bound by theory, a mixture of species is believed to be present in the solution compositions of this invention. At this time, the species in solution are not well characterized. In this connection, for examples of species present in solutions containing molybdenum and phosphorus, see J. Bergwerff, Ph.D. thesis, Utrecht University, The Netherlands, 2007, Chapter 2C.

The solution compositions of this invention generally involve water, and can be thought of as aqueous solutions, although in at least some instances the amount of the glycol additive(s) is greater than the amount of water.

In the solutions which are compositions of this invention, the Group VI metal is molybdenum, tungsten, or chromium. Preferably, the Group VI metal is molybdenum or tungsten, more preferably molybdenum. The Group VIII metal is iron, nickel and/or cobalt, preferably nickel and/or cobalt. The atomic ratios of phosphorus to the Group VI metal in the composition are typically at least about 0.33:1, preferably about 0.33:1 to about 0.8:1, more preferably about 0.38:1 to about 0.7:1, and still more preferably about 0.45:1 to about 0.7:1. The atomic ratio of Group VI metal to Group VIII metal is generally at least about 1.5:1, preferably in the range of about 1.5:1 to about 6:1, and more preferably about 2:1 to about 5:1. The molar ratio of additive to hydrogenation metals is above about 0.30:1, preferably at least about 0.31:1, more preferably at least about 0.33:1, and still more preferably at least about 0.35:1. Preferably, the molar ratio of additive to hydrogenation metals is in the range of about 0.30:1 to about 0.6:1, more preferably in the range of about 0.33:1 to about 0.6:1, still more preferably in the range of about 0.35:1 to 0.6:1, and especially 0.4:1 to about 0.6:1.

When mixtures of reagents are used in forming the solution compositions, as mentioned above, a mixture of species will be present in the solution. For example, if a molybdenum compound and a tungsten compound are used, the product solution will include molybdenum and tungsten. In another example, if a cobalt compound and a nickel compound are used, the product solution will include cobalt and nickel. Mixtures of reagents such that Group VI metal compounds in which the Group VI metals of the compounds are different and Group VIII metal compounds in which the Group VIII metals of the compounds are different can be used in forming the solution compositions if desired.

While the concentration of the species in the solution compositions of this invention is not of significance for the compositions, it is often convenient to work at concentrations that are practical for further intended use of the solution. For example, these solutions can be employed, as embodied in this invention, to form a catalyst. Suitable concentrations of the Group VI metal (or total thereof, if more than one Group VI metal is present in the composition) in the solution compositions of the invention (with the additives present) are typically in the range of about 1.35 mol/L to about 5.9 mol/L, preferably in the range of about 1.9 mol/L to about 4.2 mol/L.

Preferred solution concentrations provide catalysts in which the Group VI metal is present in an amount of about 5 to about 40 wt %, preferably about 15 to about 36 wt %, calculated as trioxide; the Group VIII metal is present in an amount of about 1 to about 10 wt %, preferably about 2 to about 8 wt %, calculated as monoxide; and phosphorus is present in an amount of about 1 to about 10 wt %, preferably about 2 to about 9 wt %, calculated as $P_2O_5$.

In processes of the invention for forming catalysts, catalysts are formed by bringing together a carrier and an impregnation solution to form an impregnated carrier, and drying the impregnated carrier to form a catalyst. The impregnation solution comprises a solution composition of this invention. For impregnation solutions, the preferences for the solution compositions of the invention are as described above.

Throughout this document, the term "carrier" refers to a carrier which is in the solid form or is pre-shaped. Such a carrier remains predominantly in the solid form when contacted with an aqueous medium. The term does not refer to precursor salts, such as sodium aluminate, which dissolve almost completely in an aqueous medium. The carrier may be composed of conventional oxides, e.g., alumina, silica, silica-alumina, alumina with silica-alumina dispersed therein, alumina-coated silica, silica-coated alumina, magnesia, zirconia, boria, and titania, as well as mixtures of these oxides. Suitable carriers also include transition aluminas, for example an eta, theta, or gamma alumina. Preferred carriers include of silica, alumina, silica-alumina, alumina with silica-alumina dispersed therein, alumina-coated silica, or silica-coated alumina, especially alumina or alumina containing up to about 20 wt % of silica, preferably up to about 12 wt % of silica. A carrier containing a transition alumina, for example an eta, theta, or gamma alumina is particularly preferred, and a gamma-alumina carrier is most preferred.

The carrier is normally employed in a conventional manner in the form of spheres or extrudates. Examples of suitable types of extrudates have been disclosed in the literature; see for example U.S. Pat. No. 4,028,227. Highly suitable for use are cylindrical particles (which may or may not be hollow) as well as symmetrical and asymmetrical polylobed particles (2, 3 or 4 lobes). Shaped carrier particles are typically calcined at a temperature in the range of about 400° to about 850° C.

The carrier's pore volume (measured via $N_2$ adsorption) will generally be in the range of about 0.25 to about 1 mL/g. The specific surface area will generally be in the range of about 50 to about 400 $m^2/g$ (measured using the BET method). Generally, the catalyst will have a median pore diameter in the range of about 7 nm to about 20 nm, preferably in the range of about 9 nm to about 20 nm, as determined by $N_2$ adsorption. Preferably, at least about 60% of the total pore volume will be in the range of approximately 2 nm from the median pore diameter. The figures for the pore size distribution and the surface area given above are determined after calcination of the carrier at about 500° C. for one hour.

Methods for impregnating the carrier are known to the skilled artisan. Preferred methods include co-impregnation. In the processes of this invention for forming catalysts, only one impregnation step is needed. In the impregnation step, once the carrier and impregnation solution are brought together, the mixture is usually homogenized until virtually all of the impregnation solution is taken up into the catalyst. In this technique, which is known in the art as pore volume impregnation or as incipient wetness impregnation, the impregnation solution will be taken up virtually completely by the pores of the catalyst, which makes for an efficient use of chemicals, and avoids dust in the product.

There can be a wide number of variations on the impregnation method. Thus, it is possible to apply a plurality of impregnating steps, the impregnating solutions to be used containing one or more of the component precursors that are to be deposited, or a portion thereof. Instead of impregnating techniques, there can be used dipping methods, spraying methods, and so forth. When carrying out multiple impregnation, dipping, etc., steps, drying and/or calcining may be carried out between impregnation steps. However, a single impregnation step is preferred because it is a faster, simpler process, allowing for a higher production rate, and is less costly. Single impregnation also tends to provide catalysts of better quality.

Impregnation of a carrier with a solution composition of the present invention yields catalysts in which the Group VIII metal is usually present in an amount of about 1 to about 10 wt %, preferably about 3 to about 8.5 wt %, calculated as a monoxide. In these catalysts, phosphorus is usually present in an amount of about 1 to about 10 wt %, more preferably about 2 to about 9 wt %, calculated as $P_2O_5$. When the Group VI metal in the catalyst is molybdenum, it will usually be present in an amount of about 35 wt % or less, preferably in an amount of about 15 to about 35 wt %, calculated as molybdenum trioxide.

After the impregnation step, the impregnated carrier is normally dried to remove the solvent (usually water). The drying step may be carried out in air, under vacuum, or in the presence of an inert gas. Generally, a drying temperature below about 220° C. is recommended. The impregnated carrier (after optional drying, if carried out) is optionally calcined at a temperature in the range of about 220° to about 650° C., preferably about 350° to about 600° C.

Drying of the impregnated carrier is conducted under such conditions that at least a portion of the additive remains in the catalyst, i.e., the additive is not completely removed by evaporation or decomposition. Thus, the drying conditions to be applied depend on the temperature at which the additive boils or decomposes; decomposition can include combustion when the drying is conducted in the presence of oxygen. In these processes of the invention, the drying step should be carried out under such conditions that at least about 50%, preferably at least about 70%, more preferably at least about 90%, of the additive which was incorporated into the catalyst in the impregnation step is still present in the catalyst after the drying step. It is preferred to keep as much of the additive as possible in the catalyst during the drying step; however, it is understood that evaporation of some of the additive during the drying step cannot always be avoided. A drying temperature below about 220° C. may be necessary; often, a temperature below about 120° C. is recommended and preferred.

Optionally, catalysts of the invention may be subjected to a sulfidation step (treatment) to convert the metal components to their sulfides. It has been observed that more of the additive is retained as part of the catalyst composition during the sufidation step when additives with higher boiling points are used. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., an organic or inorganic polysulfide or elemental sulfur, outside the reactor and, if necessary, dried. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulphiding agent, such as hydrogen sulfide or a compound which under the prevailing conditions is decomposable into hydrogen sulphide. It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent such as dimethyldisulfide (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

The catalyst compositions of this invention are those produced by the above-described process, whether or not the process included an optional sulfiding step.

The catalyst compositions of this invention can be used in the hydrotreating, hydrodenitrogenation, and/or hydrodesulfurization of a wide range of hydrocarbon feeds. Examples of suitable feeds include middle distillates, kero, naphtha, vacuum gas oils, heavy gas oils, and the like.

Methods of the invention are methods for hydrotreating, hydrodenitrogenation, and/or hydrodesulfurization of a hydrocarbon feed, which methods comprise contacting a hydrocarbon feed and a catalyst of the invention. Hydrotreating of hydrocarbon feeds involves treating the feed with hydrogen in the presence of a catalyst composition of the invention at hydrotreating conditions.

Conventional hydrotreating process conditions, such as temperatures in the range of about 250° to about 450° C., reactor inlet hydrogen partial pressures in the range of about 5 to about 250 bar, space velocities in the range of about 0.1 to about 10 vol./vol.hr, and $H_2$/feed ratios in the range of about 50 to about 2000 NL/L, can be applied.

The following examples are presented for purposes of illustration, and are not intended to impose limitations on the scope of this invention.

Example 1

In a flask, a solution was prepared by dispersing $NiCO_3$ powder (98.7 g; 49 wt % Ni) in water to make a stirrable slurry. $H_3PO_4$ (aq., 85%, 174.9 g) was then added to the slurry, followed by $MoO_3$ (369.2 g). The slurry was then heated at 92° C. until the slurry became a clear solution having 41.9 wt % $MoO_3$. This was solution A, in which the P:Mo molar ratio was 0.58:1.

Eleven 15 mL flasks were each filled with 8.8 g of solution A. Polyethylene glycol-200 in varying amounts was added to each flask; the amounts are listed in Table 1 below. One flask had no polyethylene glycol-200 added, and is a comparative run. Water was added to each flask to obtain a final volume of 9.27 mL. Each flask was shaken and the amount of precipitate (height of solid in the flask, in mm) was recorded after one day. The flasks were then placed in a 60° C. oven for one day, after which the amount of precipitate was again recorded. The flasks were then removed from the oven and were allowed to cool to room temperature. After another day, the amount of precipitate in each flask was recorded again. Results are summarized in Table 1; runs 1-6 are comparative.

TABLE 1

| Run | Amt. PEG-200[1] | Mol. ratio additive:metals[2] | Before heating | At 60° C. | Cooled to room T |
|---|---|---|---|---|---|
| 1 | 0 g | 0:1 | No precip. | No precip | No precip. |
| 2 | 0.395 g | 0.06:1 | Precip. - 1 mm | No precip | Precip. - 2.1 mm |
| 3 | 0.79 g | 0.12:1 | Precip. - 3 mm | No precip | Precip. - 3.0 mm |
| 4 | 1.185 g | 0.18:1 | Precip. - 3 mm | No precip | Precip. - 1.2 mm |
| 5 | 1.58 g | 0.24:1 | Precip. - 2 mm | No precip. | Precip. - 1.5 mm |
| 6 | 1.975 g | 0.3:1 | Precip. - 1 mm | No precip. | Precip. - 0.6 mm |
| 7 | 2.37 g | 0.36:1 | Precip. - 0.3 mm | No precip. | No precip. |
| 8 | 2.765 g | 0.42:1 | No precip. | No precip. | No precip. |
| 9 | 3.16 g | 0.48:1 | No precip. | No precip. | No precip. |
| 10 | 3.555 g | 0.54:1 | No precip. | No precip. | No precip. |
| 11 | 3.95 g | 0.6:1 | No precip. | No precip. | No precip. |

[1]Polyethylene glycol-200.
[2]Here, the term "metals" refers to hydrogenation metals.

Example 2

In a flask, a solution was prepared by dispersing $NiCO_3$ powder (73.0 g; 49 wt % Ni) in water to make a stirrable slurry. $H_3PO_4$ (aq., 85%, 31.43 g) was then added to the slurry, followed by $MoO_3$ (273.12 g). The slurry was then heated at 92° C. until the slurry became a clear solution having 46.4 wt % $MoO_3$. This was solution B, in which the P:Mo molar ratio was 014:1. In all of the inventive runs of this Example, more $H_3PO_4$ was added as described herein.

Eight 30 mL flasks (experiments a to h) were each filled with different amounts of solution A or B (see Table 2 below). To some of the flasks, additional $H_3PO_4$ (aq., 85 wt %) was added; the amounts are listed in Table 2 below. The additional $H_3PO_4$ was mixed into the respective solutions. Then 0.22 mol of polyethylene glycol-200/(mol Mo+Ni) was added to each flask (for amount see Table 2). After mixing the polyethylene glycol-200 into the solution, water was added to each flask to obtain a final volume of 19.25 mL. Each flask was shaken again and the presence of precipitate was recorded after one day. The flasks were then placed in a 60° C. oven for one day, after which the presence of precipitate was recorded again. The results are summarized in Table 2; runs a-d are comparative.

TABLE 2

| Run | Soln. | Amt. Soln. | Amt. PEG-200[1,2] | Additional $H_3PO_4$ (85%) | Molar ratio P:Mo | Before heating | At 60° C. |
|---|---|---|---|---|---|---|---|
| a | B | 18.39 g | 3.35 g | 0.00 g[3] | 0.14:1 | No precip. | No precip. |
| b | B | 18.6 g | 3.39 g | 0.47 g | 0.21:1 | Precip. | No precip. |
| c | B | 18.74 g | 3.41 g | 0.77 g | 0.25:1 | Precip. | No precip. |
| d | B | 18.87 g | 3.44 g | 1.07 g | 0.29:1 | Precip. | No precip. |
| e | B | 19.01 g | 3.46 g | 1.37 g | 0.33:1 | Precip. | No precip. |
| f | B | 19.15 g | 3.49 g | 1.68 g | 0.37:1 | Precip. | Precip. |
| g | B | 19.3 g | 3.51 g | 2.00 g | 0.41:1 | Precip. | Precip. |
| h | A | 22 g | 3.63 g | 0.00 g[4] | 0.58:1 | Precip. | Precip. |

[1]Polyethylene glycol-200.
[2]The molar ratio of additive: metals in all runs was 0.22:1; the term "metals" refers to hydrogenation metals.
[3]All of the $H_3PO_4$ is from Solution B.
[4]All of the $H_3PO_4$ is from Solution A.

Example 3

The experiments as described in Example 2 were repeated, but with 0.44 mol polyethylene glycol-200/(mol Mo+Ni). These experiments (i to p) are summarized in Table 3 below; experiments i-1 are comparative.

TABLE 3

| Run | Soln. | Amt. Soln. | Amt. PEG-200[1,2] | Additional $H_3PO_4$ (85%) | Molar ratio P:Mo | Room temp. |
|---|---|---|---|---|---|---|
| i | B | 18.39 g | 6.7 g | 0.00 g[3] | 0.14:1 | No precip. |
| j | B | 18.6 g | 6.78 g | 0.47 g | 0.21:1 | No precip. |
| k | B | 18.74 g | 6.82 g | 0.77 g | 0.25:1 | No precip. |
| l | B | 18.87 g | 6.88 g | 1.07 g | 0.29:1 | No precip. |
| m | B | 19.01 g | 6.92 g | 1.37 g | 0.33:1 | No precip. |
| n | B | 19.15 g | 6.98 g | 1.68 g | 0.37:1 | No precip. |
| o | B | 19.3 g | 7.02 g | 2.00 g | 0.41:1 | No precip. |
| p | A | 22 g | 7.26 g | 0.00 g[4] | 0.58:1 | Precip. |

[1]Polyethylene glycol-200.
[2]The molar ratio of additive: metals in all runs was 0.44:1; the term "metals" refers to hydrogenation metals.
[3]All of the $H_3PO_4$ is from Solution B.
[4]All of the $H_3PO_4$ is from Solution A.

The results in Tables 2 and 3 show that with 0.22 mol polyethylene glycol-200/(mol Mo+Ni), precipitate formation starts at a P:Mo molar ratio of about 0.21:1 at room temperature. At 60° C., precipitate formation starts at about a P:Mo molar ratio of about 0.37:1. With the doubled amount of polyethylene glycol-200 in Example 3, precipitate formation at room temperature starts at a P:Mo molar ratio of about 0.58:1.

Example 4

In a flask, a solution was prepared by dispersing $NiCO_3$ powder (40.26 g; 48.8 wt % Ni) in water to make a stirrable slurry. About 30% of the $H_3PO_4$ (aq., 85%, total amount 71.1 g) was then added to the slurry, followed by $MoO_3$ (100% $MoO_3$; 150 g). The slurry was then heated at 92° C. for about 30 minutes, after which the remaining $H_3PO_4$ was added. The heating was continued until a clear solution containing 828 g $MoO_3$/L (~5.75 mol $MoO_3$/L) was obtained. The final volume of the solution was ca. 181 mL. This was solution C, in which the P:Mo molar ratio was 0.6:1.

Six 15 mL flasks were each filled with 12.0 g of solution C. Polyethylene glycol-300 in varying amounts was added to each flask; the amounts are listed in Table 4 below. One flask had no polyethylene glycol-300 added, and is a comparative run. Water was added to each flask to obtain a final volume of 10 mL. Each flask was shaken and checked for the presence of precipitate after one day. The flasks were then placed in a 60° C. oven for one day and then they were again checked for the presence of precipitate. The flasks were then removed from the oven and were allowed to cool to room temperature. After another day, the flasks were again checked for the presence of precipitate. Results are summarized in Table 4; runs 1-5 are comparative.

TABLE 4

| Run | Amt. PEG-300[1] | Mol. ratio additive:metals[2] | Before heating | At 60° C. | Cooled to room T |
|---|---|---|---|---|---|
| 1 | 0 g | 0:1 | No precip. | No precip. | No precip. |
| 2 | 1.41 g | 0.1:1 | Precip. | — | — |
| 3 | 2.77 g | 0.2:1 | Precip. | — | — |
| 4 | 3.47 g | 0.25:1 | Precip. | Precip. | Precip. |
| 5 | 4.44 g | 0.32:1 | Precip. | Precip. | Precip. |
| 6 | 5.49 g[3] | 0.4:1 | No precip. | — | — |

[1]Polyethylene glycol-300.
[2]Here, the term "metals" refers to hydrogenation metals.
[3]Final volume was 10.9 mL.

Example 5

Seven 15 mL flasks were each filled with 12.0 g of solution C (prepared as described in Example 4). Polyethylene glycol-400 in varying amounts was added to each flask; the amounts are listed in Table 5 below. One flask had no polyethylene glycol-400 added, and is a comparative run. Water was added to each flask to obtain a final volume of 10 mL. Each flask was shaken and checked for the presence of precipitate after one day. The flasks were then placed in a 60° C. oven for one day and then they were again checked for the presence of precipitate. The flasks were then removed from the oven and were allowed to cool to room temperature. After another day, the flasks were again checked for the presence of precipitate. Results are summarized in Table 5; runs 1-6 are comparative.

TABLE 5

| Run | Amt. PEG-400[1] | Mol. ratio additive:metals[2] | Before heating | At 60° C. | Cooled to room T |
|---|---|---|---|---|---|
| 1 | 0 g | 0:1 | No precip. | No precip | No precip. |
| 2 | 1.84 g | 0.1:1 | Precip. | — | — |
| 3 | 2.75 g | 0.15:1 | Precip. | — | — |
| 4 | 3.67 g | 0.20:1 | Precip. | — | — |
| 5 | 4.45 g | 0.24:1 | Precip. | Precip. | Precip. |
| 6 | 5.49 g[3] | 0.30:1 | Precip. | — | — |
| 7 | 8.30 g[4] | 0.45:1 | Trace precip. | — | — |

[1]Polyethylene glycol-400.
[2]Here, the term "metals" refers to hydrogenation metals.
[3]Final volume was 10.9 mL.
[4]Final volume was 13.4 mL.

Example 6

Five 15 mL flasks were each filled with 12.0 g of solution C (prepared as described in Example 4). A 50:50 (weight basis) mixture of polyethylene glycol-300 and triethylene glycol (TEG) was added to each flask in varying amounts; the amounts are listed in Table 6 below. One flask had no polyethylene glycol-300 and triethylene glycol (TEG) added, and is a comparative run. Water was added to each flask to obtain a final volume of 10 mL. Each flask was shaken and checked for the presence of precipitate after one day. The flasks were then placed in a 60° C. oven for one day and then they were again checked for the presence of precipitate. The flasks were then removed from the oven and were allowed to cool to room temperature. After another day, the flasks were again checked for the presence of precipitate. Results are summarized in Table 6; runs 1-3 are comparative.

TABLE 6

| Run | Amt. PEG-300[1] | Amt. TEG[2] | Mol. ratio additive[3]:metals[4] | Before heating | At 60° C. | Cooled to room T |
|---|---|---|---|---|---|---|
| 1 | 0 g | 0 g | 0:1 | No precip. | No precip | No precip. |
| 2 | 1.26 g | 1.26 g | 0.27:1 | Precip. | Precip. | Precip. |
| 3 | 1.38 g | 1.38 g | 0.30:1 | Precip. | Precip. | Precip. |
| 4 | 1.91 g | 1.91 g | 0.41:1 | Precip. | No precip. | No precip. |
| 5 | 2.25 g | 2.25 g | 0.49:1 | Precip. | No precip. | No precip. |

[1]Polyethylene glycol-300.
[2]Triethylene glycol (TEG).
[3]Mol. additive = mol. polyethylene glycol-300 + mol. triethylene glycol (TEG).
[4]Here, the term "metals" refers to hydrogenation metals.

Example 7

Five 15 mL flasks were each filled with 12.0 g of solution C (prepared as described in Example 4). A 50:50 (weight basis) mixture of polyethylene glycol-400 and triethylene glycol (TEG) was added to each flask in varying amounts; the amounts are listed in Table 7 below. One flask had no polyethylene glycol-400 and triethylene glycol (TEG) added, and is a comparative run. Water was added to each flask to obtain a final volume of 10 mL. Each flask was shaken and checked for the presence of precipitate after one day. The flasks were then placed in a 60° C. oven for one day and then they were again checked for the presence of precipitate. The flasks were then removed from the oven and were allowed to cool to room temperature. After another day, the flasks were again checked for the presence of precipitate. Results are summarized in Table 7; runs 1-4 are comparative.

TABLE 7

| Run | Amt. PEG-400[1] | Amt. TEG[2] | Mol. ratio additive[3]:metals[4] | Before heating | At 60° C. | Cooled to room T |
|---|---|---|---|---|---|---|
| 1 | 0 g | 0 g | 0:1 | No precip. | No precip | No precip. |
| 2 | 0.74 g | 0.74 g | 0.15:1 | Precip. | Precip. | Precip. |
| 3 | 1.24 g | 1.24 g | 0.25:1 | Precip. | Precip. | Precip. |
| 4 | 1.76 g | 1.76 g | 0.35:1 | Precip. | Precip. | Precip. |
| 5 | 2.24 g | 2.24 g | 0.45:1 | Precip. | Precip. | No precip. |

[1]Polyethylene glycol-400.
[2]Triethylene glycol (TEG).
[3]Mol. additive = mol. polyethylene glycol-400 + mol. triethylene glycol (TEG).
[4]Here, the term "metals" refers to hydrogenation metals.

Example 8

Comparative

Five 15 mL flasks were each filled with 12.0 g of solution C (prepared as described in Example 4). Polyethylene glycol-600 in varying amounts was added to each flask; the amounts are listed in Table 8 below. One flask had no polyethylene glycol-600, and is a comparative run. Water was added to each flask to obtain a final volume of 10 mL. Each flask was shaken and checked for the presence of precipitate after one day. The flasks were then placed in a 60° C. oven for one day and then they were again checked for the presence of precipitate. The flasks were then removed from the oven and were allowed to cool to room temperature. After another day, the flasks were again checked for the presence of precipitate. Results are summarized in Table 8.

TABLE 8

| Run | Amt. PEG-600[1] | Mol. ratio additive:metals[2] | Before heating | At 60° C. | Cooled to room T |
|---|---|---|---|---|---|
| 1 | 0 g | 0:1 | No precip. | No precip | No precip. |
| 2 | 1.38 g | 0.05:1 | Precip. | Precip. | Precip. |
| 3 | 2.75 g | 0.10:1 | Precip. | Precip. | Precip. |
| 4 | 4.21 g | 0.15:1 | Precip. | Precip. | Precip. |
| 5 | 4.48 g | 0.16:1 | Precip. | Precip. | Precip. |

[1]Polyethylene glycol-600.
[2]Here, the term "metals" refers to hydrogenation metals.

Example 9

In a flask, a solution was prepared by adding just enough water to $NiCO_3$ powder (49 wt % Ni in $NiCO_3$, 90.93 g) to make a stirrable suspension. $H_3PO_4$ (aq., 85%, 39.12 g) was then added to the suspension, followed by about 40% of the $MoO_3$ (total amount of $MoO_3$: 340 g). The suspension was then heated at 92° C. until the suspension became more stirrable, then the remaining $MoO_3$ was added stepwise. After about 30 minutes at 92° C., a clear solution was obtained. The final volume of this solution was ca. 400 mL. The concentrations of the resulting solution were 850 g $MoO_3$/L (~5.90 mol Mo/L), 142 g NiO/L (~1.89 mol Ni/L), and 60.2 g $P_2O_5$/L (~0.85 mol P/L). This was solution D, in which the P:Mo molar ratio was 0.14:1. In all of the inventive runs of this Example, more $H_3PO_4$ was added as described herein; after adding the further $H_3PO_4$, the P:Mo molar ratio was 0.55:1 in all runs.

Six 15 mL flasks were each filled with 3.04 mL of solution D. The solution composition was varied by the addition of water, followed by the addition of citric acid (50 wt. % solution; 1.319 g/ml), followed by the addition of $H_3PO_4$ (85 wt. %; 1.71 g/mL) and, finally, polyethylene glycol-200 (PEG-200, 100 wt. %; 1.128 g/mL) was added to the solution. Water was added to each flask to obtain a final volume of 7 mL. The amounts of $H_3PO_4$, polyethylene glycol-200, and citric acid added are listed in Table 9. Each flask was shaken and checked for the presence of precipitate after one day; all flasks contained precipitate. The flasks were then placed in a 60° C. oven for one day, removed from the oven, and allowed to cool to room temperature. After another day, the flasks were again checked for the presence of precipitate, and the amount of precipitate (height of solid in the flask, in mm) was recorded. Results are summarized in Table 9; runs 1-4 are comparative.

TABLE 9

| Run | Amt. $H_3PO_4$[1] | Amt. PEG-200[2] | Mol. ratio additive:metals[3] | Amt. citric acid | Before heating | After heating and cooling to room T |
|---|---|---|---|---|---|---|
| 1 | 0.49 mL | 0.56 mL | 0.14:1 | 0 | Precip. | Precip. - 8 mm |
| 2 | 0.49 mL | 0.56 mL | 0.14:1 | 1.04 mL | Precip. | Precip. - 13 mm |
| 3 | 0.49 mL | 1.12 mL | 0.28:1 | 0 | Precip. | Precip. - 10 mm |
| 4 | 0.49 mL | 1.12 mL | 0.28:1 | 1.04 mL | Precip. | Precip. - 13 mm |

TABLE 9-continued

| Run | Amt. H₃PO₄[1] | Amt. PEG-200[2] | Mol. ratio additive:metals[3] | Amt. citric acid | Before heating | After heating and cooling to room T |
|---|---|---|---|---|---|---|
| 5 | 0.49 mL | 2.24 mL | 0.55:1 | 0 | Precip. | No precip. |
| 6 | 0.49 mL | 2.24 mL | 0.55:1 | 1.04 mL | Precip. | No precip. |

[1] In addition to that present from solution D.
[2] Polyethylene glycol-200.
[3] Here, the term "metals" refers to hydrogenation metals.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. A process for forming a solution composition, which process comprises
  A) bringing together, in an aqueous medium,
    i) at least one phosphorus compound,
    ii) at least one Group VI metal compound,
    iii) at least one Group VIII metal compound, and
    iv) an additive which is
      a) tetraethylene glycol,
      b) polyethylene glycol having an average molecular weight in the range of about 200 to about 400,
      c) a mixture of tetraethylene glycol and polyethylene glycol having an average molecular weight in the range of about 200 to about 400, or
      d) a mixture of (1) tetraethylene glycol and/or polyethylene glycol having an average molecular weight in the range of about 200 to about 400 and
      (2) one or more of monoethylene glycol, diethylene glycol, and triethylene glycol,
    where the molar ratio of additive to the total moles of Group VI metal and Group VIII metal is about 0.36:1 to about 0.6:1, and where the atomic ratio of phosphorus to Group VI metal is at least about 0.33:1, to form a primary solution;
  B) optionally heating said primary solution at a temperature above about 40° C. to form a heated solution; and
  C) optionally cooling said heated solution to form a cooled solution.

2. A process as in claim 1 wherein said atomic ratio of phosphorus to Group VI metal is about 0.33:1 to about 0.8:1, and/or wherein said Group VI metal compound and the Group VIII metal compound are in an amount such that the Group VI metal and the Group VIII metal are in an atomic ratio of at least about 1.5:1.

3. A process as in claim 1 wherein said phosphorus compound is a water soluble, acidic phosphorus compound, optionally wherein said phosphorus compound is orthophosphoric acid.

4. A process as in claim 1 wherein said Group VIII metal compound is a carbonate, hydroxide, or hydroxy-carbonate, and/or wherein said Group VI metal compound is an oxide or an oxo-acid.

5. A process as in claim 1 wherein said additive is polyethylene glycol having an average molecular weight in the range of about 200 and about 400, or a mixture of triethylene glycol and tetraethylene glycol and/or polyethylene glycol having an average molecular weight in the range of about 200 to about 400.

6. A process as in claim 1 wherein an organic acid is included, which organic acid has at least one acid group and at least one functional group selected from a hydroxyl group and an acid group, optionally wherein said organic acid is citric acid.

7. A process as in claim 1 wherein said Group VI metal is molybdenum and/or tungsten, and/or wherein said Group VIII compound is a nickel or cobalt compound.

8. A composition formed as in claim 1, which composition comprises a Group VI metal, a Group VIII metal, phosphorus, and an additive which is
  a) tetraethylene glycol,
  b) polyethylene glycol having an average molecular weight in the range of about 200 to about 400,
  c) a mixture of tetraethylene glycol and polyethylene glycol having an average molecular weight in the range of about 200 to about 400, or
  d) a mixture of (1) tetraethylene glycol and/or polyethylene glycol having an average molecular weight in the range of about 200 to about 400 and (2) one or more of monoethylene glycol, diethylene glycol, and triethylene glycol, where the molar ratio of additive to the total moles of Group VI metal and Group VIII metal is about 0.36:1 to about 0.6:1, and where the atomic ratio of phosphorus to Group VI metal is at least about 0.33:1.

9. A composition as in claim 8 wherein said atomic ratio of phosphorus to Group VI metal is in the range of about 0.33:1 to about 0.8:1, and/or wherein said Group VI metal compound and the Group VIII metal compound are in an amount such that the Group VI metal and the Group VIII metal are in an atomic ratio of about 1.5:1 to about 6:1.

10. A composition as in claim 8 wherein said Group VI metal is molybdenum and/or tungsten, and/or wherein said Group VIII metal is nickel or cobalt.

11. A process for forming a catalyst, which process comprises
   I) bringing together a carrier and an impregnation solution, which impregnation comprises a composition of claim 8, to form an impregnated carrier; and
   II) drying the impregnated carrier, and
   III) optionally calcining the impregnated carrier,
   to form a catalyst, and optionally sulfiding the catalyst.

12. A process as in claim 11 wherein I) comprises a single impregnation step.

13. A process as in claim 11 wherein said carrier is silica, alumina, silica-alumina, alumina with silica-alumina dispersed therein, alumina-coated silica, or silica-coated alumina.

14. A process as in claim 11 wherein at least one organic acid, which organic acid has at least one acid group and at least one functional group selected from a hydroxyl group and an acid group, is present in the impregnation solution, optionally wherein said organic acid is citric acid.

15. A process as in claim 1 wherein the molar ratio of (1) to (2) is 0.15:1 or more.

* * * * *

UNITED STATES PATENT AND TRADEMARK OFFICE
CERTIFICATE OF CORRECTION

PATENT NO. : 9,254,478 B2
APPLICATION NO. : 13/391336
DATED : February 9, 2016
INVENTOR(S) : Sona Eijsbouts-Spickova and Marcel Adriaan Jansen It is certified that error appears in the above-identified patent and that said Letters Patent is hereby corrected as shown below:

Claims

Column 17, Line 17, Claim 11, part I) reads "which impregnation comprises a" and should read -- which impregnation solution comprises a --.

Signed and Sealed this
Twenty-eighth Day of June, 2016

Michelle K. Lee
*Director of the United States Patent and Trademark Office*